United States Patent [19]

Holm et al.

[11] Patent Number: 4,931,303

[45] Date of Patent: Jun. 5, 1990

[54] METHOD FOR CONTROLLING THE SURFACE BUBBLING OF FABRICATED SNACK PRODUCTS

[75] Inventors: David Holm, Idaho Falls; Veldon M. Hix, both of Idaho Falls, Id.; Miles J. Willard, 299 N. Lloyd Cir., Idaho Falls, Id. 83402

[73] Assignee: Miles J. Willard, Idaho Falls, Id.

[21] Appl. No.: 144,880

[22] Filed: Jan. 15, 1988

[51] Int. Cl.$^5$ .......................... A21D 13/00; A23B 4/04
[52] U.S. Cl. .................................. 426/549; 426/440; 426/445; 426/446; 426/465
[58] Field of Search ............... 426/438, 439, 440, 441, 426/445, 446, 456, 457, 458, 465, 559, 560, 549, 550

[56] References Cited

U.S. PATENT DOCUMENTS

| | | | |
|---|---|---|---|
| 2,905,559 | 9/1959 | Anderson et al. | 99/30 |
| 3,076,711 | 2/1963 | Gerkens | 426/465 |
| 3,131,063 | 4/1964 | Gerkens | 426/441 |
| 3,230,094 | 1/1966 | Hilton | 99/207 |
| 3,278,311 | 10/1966 | Brown et al. | 99/30 |
| 3,493,390 | 2/1970 | Succo | 99/100 |
| 3,502,479 | 3/1970 | Singer et al. | 99/100 |
| 3,519,432 | 7/1970 | Succo et al. | 99/100 |
| 3,690,895 | 9/1972 | Amadon | 99/80 R |
| 3,703,378 | 11/1972 | Bretch | 426/559 |
| 3,800,050 | 3/1974 | Popel | 426/343 |
| 3,812,274 | 5/1974 | Weaver | 426/465 |
| 3,880,069 | 4/1975 | Moline | 94/483 |
| 3,883,671 | 5/1975 | Shatila | 426/303 |
| 3,997,684 | 12/1976 | Willard | 426/550 |
| 4,170,659 | 10/1979 | Totino et al. | 426/138 |
| 4,395,216 | 7/1983 | Antesberger et al. | 425/290 |
| 4,650,687 | 5/1987 | Willard et al. | 426/438 |
| 4,761,294 | 8/1988 | Hamann et al. | 426/438 |

OTHER PUBLICATIONS

Feustel, I. C., "Miscellaneous Products from Potatoes", *Potato Processing,* 4th Edition, pp. 742-744.
Gomez, M. H., "Dry Corn Masa Flours for Tortilla and Snack Food Products", *Cereal Foods World,* vol. 1987, vol. 32, No. 5, pp. 372-377.
Hendel, C. E., "Factors Influencing Texture and Structure of Potato Products", Tenth Annual Utilization Conference, Idaho Falls, ID, Jul. 20-22, 1959, pp. 69-71.
McCabe et al., "Drying Solids", *Unit Operations of Chemical Engineering,* 4th Ed., pp. 713, 722-723.
Reeve, R. M. et al., "Microscopic Structure of Potato Chips", *American Potato Journal,* vol. 37, 1960, pp. 45-52.
Smith, O., "Texture of Crispness", *Potato Processing,* 4th Ed., p. 442.
Smith, O., "Potato Chips—Fabricated", *Potato Processing,* 4th Ed., pp. 467-468.
Watson et al., "Food Uses of Corn", *Corn: Chemistry and Technology,* pp. 414-415.

*Primary Examiner*—Donald E. Czaja
*Assistant Examiner*—Helen Pratt
*Attorney, Agent, or Firm*—Hopkins French Crockett Springer & Hoopes

[57] ABSTRACT

The invention comprises a dough preform which when fried, produces a snack chip product having a predetermined level of surface bubbling. The dough preform has outer dough portions having substantially less moisture than inner dough portion. The dough preform is made by a process that includes sheeting a dough having from about 30% to about 55% moisture, removing a portion of the moisture from the dough sheet, at a greater rate from the outer dough portions than from the inner dough portion and then frying the partially dried dough prior to any significant equilibration of moisture between the outer and inner dough portions. The moisture can be removed from the dough sheet or preform by heat, air movement or a combination of the two.

18 Claims, 6 Drawing Sheets

METHOD FOR CONTROLLING THE SURFACE BUBBLING OF FABRICATED SNACK PRODUCTS

BACKGROUND OF THE INVENTION

This invention relates to food snack products and more particularly to a novel fried snack chip having a bubbled surface, with the extent of bubbling being controlled by process parameters.

Chip products (whether they be potato chips, corn or tortilla chips, etc.) are typically prepared by frying either thin slices of raw, fresh potatoes or individual chip-sized pieces of a dough made from the raw material. Such products have become increasingly popular among consumers, who are demanding an ever increasing variety of novel shapes, flavors, textures, etc.

While "potato chips" were for many years limited to fried slices of raw potatoes, increasingly the term may be inclusive of "fabricated" products as well, as evidenced by Pringles brand potato snacks manufactured by the Proctor & Gamble Company, Tato Skins brand potato snacks manufactured by the Keebler Co. Generally speaking, most prior art fabricated potato chips relied for their textural qualities upon the internal expansion of a potato-based dough to achieve the crispness and mouth feel consumers associate with conventional potato chips. Generally speaking, most prior art expanded potato snacks (i.e., snacks produced from a potato-based dough which is expanded to a porous condition by immersion in hot cooking oil) have not successfully duplicated the appearance and/or texture of potato chips because they have not duplicated the bubbling found on all conventional potato chips.

As used herein, the following words have the following definitions:

"Bubbles" or "bubbling"—separation of portions of either or both of the upper or lower surface portions of the dough preform into a number of rounded areas which protrude from the surface of the fried snack, the surface or wall of the bubble having a thinner cross-sectional dimension than that of an unbubbled portion of the fried snack.

"Pillowing"—the uncontrolled separation of a major portion of the upper and lower surface portions of a dough preform to give a rounded pillow-like area on the fried product, having extremely thin cross-sectional dimension, usually resulting in breakage.

"Blister" or "blistering"—similar to a pillow except that a blister may protrude from a single surface of the fried product, rather than both surfaces, although it will typically be broken like a pillow.

"Expanded"—refers to the internal texture of many sheeted or extruded snack products, wherein a large number of small bubbles are formed between the upper and lower surfaces of the snack product. In some expanded products, the bubbles may extend above the surface of the snack, but because they appear in such large numbers, they become the outer surface of the snack. Such products would not be considered "bubbled" or "blistered" within the context of this invention.

Blisters and pillows form in conventional potato chips because during frying of the potato slice, the starch in the outer cell layers gels and becomes dehydrated more rapidly than that starch in the center of the potato slice. Expanding steam is thus trapped within the intercellular spaces of the potato slice, forcing the cells apart as the middle lamella pectic substances between adjacent cell walls become softened and solublized. *Microscopic Structure of Potato Chips*, R. M. Reeve and E. M. Neel, *American Potato Journal*, Vol. 37 p.48. Typically, control of such blistering in fabricated potato chips is a function of dough moisture: as the moisture increases, blistering increases, and as moisture decreases, blistering decreases due to the lesser availability of water to make the entrapped steam. Excess Blistering is undesirable because chips break too readily and because they may contain large amounts of oil (*American Potato Journal*, Vo. 37). Such undesirable blistering and pillowing is controlled by lowering the dough moisture, even though such relatively dry dough is more difficult to handle during a sheeting process. Coincidentally, the lower dough moisture typically results in lower fat contents in the finished product, a phenomenon well-known to all those skilled in the art.

Corn and tortilla chips produced either by extrusion or sheeting processes, produce end products having relatively little pillowing or blistering, and a relatively unexpanded texture. The lack of bubbles in such products is due either to the presence of relatively coarse particulate materials (which provide "vents" for the escape of internally generated steam) or the process utilized to make the products. When extruded, low-moisture doughs are utilized. When sheeted, higher-moisture doughs are used, but prior to frying the individual dough preforms are baked in an oven for about 15–30 seconds at a temperature of about 302°–316° C. (575°–600° F.) in order to reduce the dough moisture. However, when making fried tortilla chips, after baking the dough preforms are equilibrated for a few minutes prior to frying. The equilibration produces uniform distribution of water within the dough preform, thereby reducing blisters and oil absorption during frying. (*Corn: Chemistry and Technology*, Watson, Ramstad, Editors).

The problem of excess bubbling or pillowing in sheeted, fried corn chips has been observed in U.S. Pat. No. 2,905,559, wherein sheeted masa dough is perforated with sharply pointed spikes, the perforations being from one-half to one-eighth inch apart. The resulting product is free from entrapped voids throughout, and all pillowing was eliminated. Likewise, pillowing of pizza dough during baking is a problem dealt with in U.S. Pat. Nos. 4,170,659 and 4,395,216. In the '659 patent, pizza dough is dockered using pins having diameters of from 3/32 inch to about ¼ inch and spaced about one inch apart. While the dockering holes will prevent the total pillowing of the pizza dough sheet, the dough is intended to pillow somewhat between the dockering holes. In '216, a pizza dough sheet is perforated using a star wheel, in which the point of the star wheel protrudes through the dough sheet and against a backup member. U.S. Pat. No. 3,880,069 discloses a perforating roll in which a pizza dough sheet is perforated by spikes, presumably to reduce or eliminate pillowing, and U.S. Pat. No. 3,278,311 discloses a corn dough sheet perforated by a dockering roll, presumably to eliminate undesirable pillowing. Finally, U.S. Pat. No. 4,650,687, commonly owned by the applicant herein, discloses a dockering process whereby blistering or pillowing is eliminated in a sheeted dough by the use of a dockering brush comprising flexible bristles which protrude through the dough sheet and against a backup member.

Various other methods of reducing blistering have been proposed in the art. For instance, the surface of a dough having a moisture content of about 25-50 percent is moistened by spraying with water, dipping in water or by steaming, so that when fried, blisters or pillows are eliminated. (U.S. Pat. No. 3,883,671) U.S. Pat. Nos. 3,493,390 and 3,519,432 disclose processes for forming a fabricated potato chip having a blistered surface resembling that of conventional potato chips. In the '432 patent, a sheeted potato dough is baked either in a 1- or a 2-phase process for from 4-16 minutes, in order to obtain the desired blistered surface. Likewise, the '390 patent provides that a chip may be prepared by laminating two or more frozen dough wafers, the air between adjacent wafers expanding upon heating and forming blisters between the wafers. Alternatively, frozen moisture on the surface of the wafers forms steam upon heating thereby causing the wafers to separate and form surface blisters. A final method whereby blistering or pillowing is prevented is by the formation of "pellets" or dried half-products. By removing substantially all of the water from a dough piece by drying, subsequent "puffing" either by frying, hot air or otherwise, will result in a greatly expanded, puffed product with little or no surface blistering, since very little water was present in the fried half-product. Examples of such technology include U.S. Pat. Nos. 3,690,895, 3,502,479, 3,230,094 and 3,800,050.

SUMMARY

Figure 1:
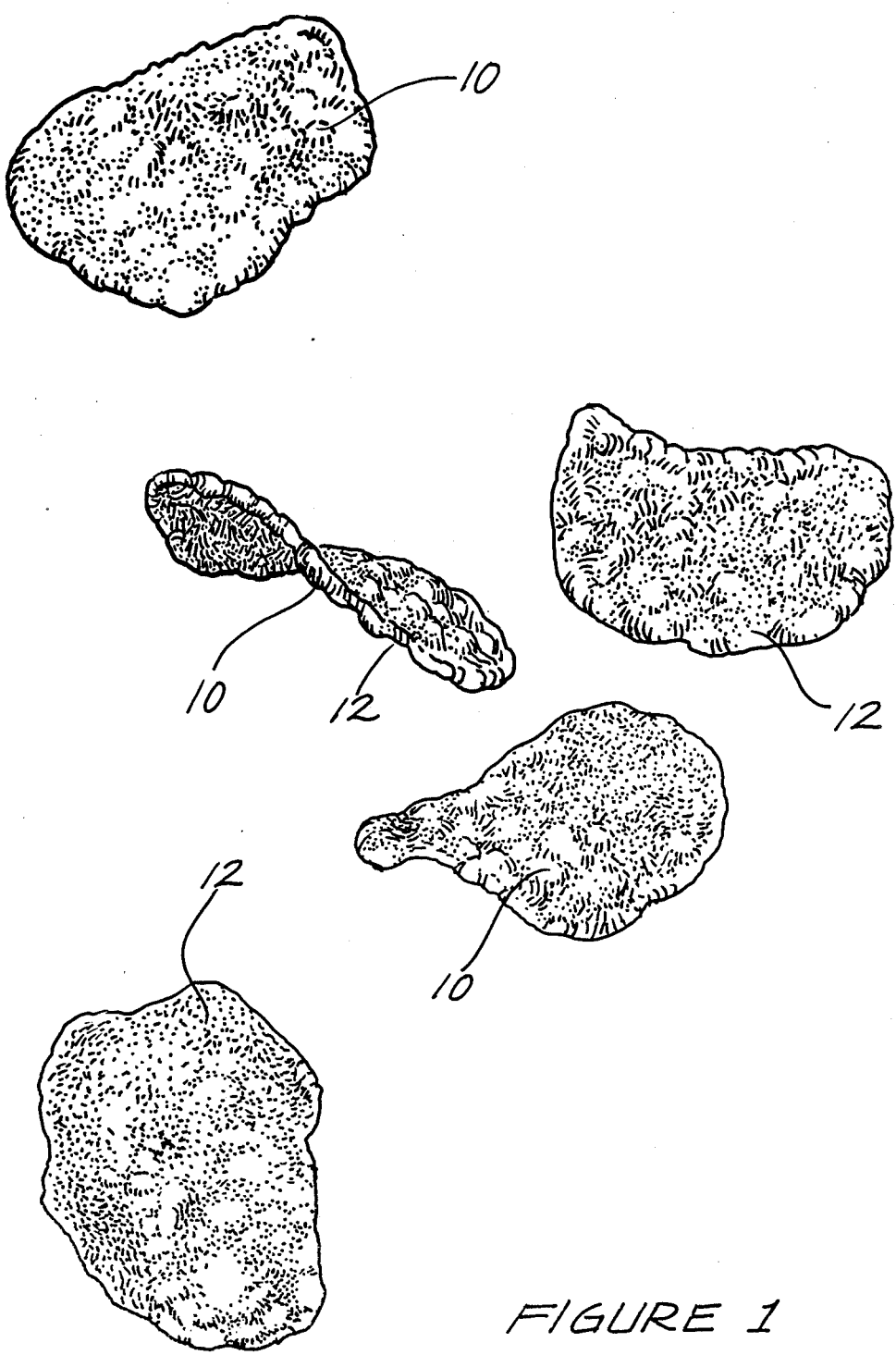
FIG. 1 is a representation of an unbubbled chip in category #1 as described herein.

This invention provides a fried snack product having a novel appearance and texture which is different from that of either conventional potato chips or sheeted fried snacks. The invention comprises a dough preform which is treated by exposure to an airstream or heat so as to create a moisture differential between the treated surface or surfaces of the dough preform and the interior of the preform.

Briefly, in its broadest embodiment, the invention resides in a dough preform which when fried produces a snack product having a controlled, predetermined level of surface bubbling. A dough preform having relatively high dough moisture of from about 30% to about 55% is treated in a drying environment so that an inner dough portion has a higher dough moisture than upper and/or lower dough surface portions. The drying environment preferentially dries the surface portions to a greater extent than the inner dough portions. It is believed that when one or both of the outer dough surface portions have a substantially lower moisture content than the inner dough portion, moisture is prevented from escaping through the dried surface of the dough preform. Such phenomenon is known as "case hardening" and results in the retention of steam (caused by the rapid heating of moisture contained in the inner dough portion) between the upper and lower dough surfaces (*Unit Operations of Chemical Engineering*, 4th Ed., McCabe, Smith & Harriott). Such phenomenon has been previously reported during the hot air dehydration of blanched potatoes creating the "popcorn" effect (*American Potato Journal*, Vol. 37 p.52).

While the desired product of the present invention may be most effectively produced by subjecting both the upper and lower dough surface portions to a drying environment, acceptable products having a controlled level of surface bubbling can be created by subjecting only one of either the upper or lower surfaces to the drying regime. Likewise, while a moving stream of heated air appears to be the preferable method to induce the desired result in a dough preform, adequate results can be obtained by subjecting dough preforms solely to heat without substantial air movement, or by exposure to significant air movement without appreciable added heat. In either case, the outer surfaces of the dough preform exposed to the drying environment will lose moisture at a greater rate than can be replaced from inner dough portions, thereby resulting in dough preforms having surfaces of significantly lower moisture content than the interior portion.

Conventional tortilla chip manufacture includes an equilibration chamber between the drying oven and the fryer. The relatively high moisture dough (52-54%) is partially dried in the oven (to a moisture content of about 40%) so as to reduce the ultimate fat content of the fried product. However, the oven creates a dough piece having drier exteriors than the inner portion which, if fried, would result in uncontrollable and unacceptable pillowing or bubbling. Therefore, an equilibration chamber is provided to equilibrate the dough moisture between the inner and outer portions of the dough piece (*Dry Corn Masa Flours for Tortilla and Snack Food*, Gomez et al. Cereal Foods World, Vol. 32, No.5 P.372. The present invention makes novel use of the perceived disadvantage of this process to create a novel chip product having a relatively highly bubbled surface, however with bubbles of appropriate size and wall thickness to withstand normal handling and distribution without substantial breakage.

The process of the present invention is equally susceptible to use with any conventional sheeted or extruded snack product, such as those made predominantly from potato solids, corn, rice, or other cereal grains. The invention will find particular use in the manufacture of fabricated potato chips from sheeted dough, or in the manufacture of corn chips from corn dough or masa or tortilla chips from similar doughs.

DETAILED DESCRIPTION OF THE PREFERRED EMBODIMENTS

This invention provides a fried snack product from a starch-containing dough having from about 30% to about 55% moisture. While the dough is described herein with an upper moisture range of about 50%, it is to be understood that subject to difficulties in processing a dough having higher moisture content, such higher moisture doughs would be acceptable for use herein. A dough having 60% moisture (or possibly even higher) could be utilized in the process of this invention, although a substantial portion of such moisture must be removed prior to frying in order to maintain the fat content of the final product within acceptable ranges and the expense in removing such moisture would appear to militate against a moisture content higher than about 55%.

The process of this invention can be generally divided into three broad areas: formation of dough pieces or preforms, drying of dough preforms and frying of dough preforms. Analysis of the finished product is an equally important step in order to classify and determine acceptable products resulting from the foregoing steps. Each of these steps will now be described in greater detail.

A. Formation of dough preforms.

A conventional dough may be formed comprising, e.g. potato solids or corn solids, raw or pre-gelatinized starches, modified starches, flavorings, oils and the like. An appropriate quantity of water is added to the foregoing ingredients and mixed to the desired dough consistency. The dough can then be formed into a thin cohesive sheet between one or more pairs of sheeting rolls commonly used in the manufacture of sheeted snack products, or as used in the baking industry. Likewise, a dough sheet may be formed by extrusion, such as by a conventional pasta extruder or the like. In certain circumstances (as will be described more fully hereinafter) it may be desirable to "docker" the dough sheet with a flexible bristle brush so as to reduce large bubbles or pillows which may otherwise form in a fried snack. The dough sheet may then be cut into the desired end product shape, such as circles, ovals, triangles, hexagons or squares. The dough preforms can then be subjected to a drying process in order to case harden the upper and/or lower surface(s) of the dough preforms so that the novel structure and texture can be created. The case hardened dough preforms are subsequently fried prior to any substantial equilibration of moisture content occurring between the inner dough portion of the dough preform and either of the upper or lower surface portions of the dough preform. Steam generated by the rapid heating of moisture within the dough preform is trapped between the upper and lower dough surface portions for a period of time sufficient to generate enough pressure to rapidly expand the surface of the dough preform, thereby creating a surface bubble. Whereas this phenomenon had been unpredictable and for the most part undesirable in prior snack food products, applicants herein describe a more particular process for creating such bubbles in a controlled manner so as to provide a finished fried snack product having a unique texture resulting from the controlled creation of large numbers of such bubbles in the fried snack product. Properties of the dough sheet which have been found to have an important effect on the controlled creation of bubbles in the finished snack product include: moisture content, thickness, presence of particulate material and cohesiveness.

As is well known in the art, the higher the moisture content of a fried material, whether it be a raw potato slice or sheeted dough pieces, the higher will be the oil absorption during frying. Removal of water during frying and its intercellular replacement with cooking oil typically is a linear relationship, so that in order to produce a fried product having less than 40% oil a sheeted dough product typically must have a moisture content lower than about 50-55%. Doughs having a moisture content greater than about 50-55% require excessive drying to create an acceptable product in terms of bubble production and oil content, whereas doughs containing less than about 30% moisture are generally too dry after the drying step to create adequate bubbles for the present invention. Generally speaking, doughs having a moisture content of from about 30% to about 55% are preferable in the process of the present invention, and most preferably, doughs having from about 36% to about 45% moisture.

Dough sheet thickness may vary within the range of about 0.5 mm to about 1.5 mm. Dough sheets near the bottom of this range will result in snack products having a thin crisp texture, whereas dough sheets near the upper end of this range will result in snack products having a relatively thicker, crunchier texture. Applicant has found that dough pieces having a thickness greater than about 1.5 mm require extreme drying conditions (either in terms of the temperature or volume of airflow, or the length of time subjected to such airflow) to effect sufficient water removal to produce the desired results. In addition, pieces greater than about 1.5 mm in thickness may be difficult to fry throughout to the desired overall moisture content of about 1%-2%, since the outer surfaces become scorched prior to the inner portions being fully cooked. Dough pieces thinner than about 0.5 mm are difficult to handle mechanically in commercial equipment without substantial distortion or folding of the chips during frying. In general, thicker dough pieces tend to bubble more readily when fried than thinner ones, presumably due to the rapid dehydration of the outer surfaces of the dough piece in contrast to the much less dehydrated inner portion of a more thicker dough piece. In a relatively thin dough piece, water is relatively quickly removed from the entire dough piece, prior to the separation of cellular material and formation of bubbles.

Particulate materials may be present in the dough preforms, either as a result of processing of the raw materials (i.e. screen size of milled corn) or intentionally inserted for textural reasons. However, because such particulate materials provide "vents" for the escape of steam during frying of dough preforms, an inordinately high level of such particulate materials may inhibit bubble formation and reduce the effectiveness of the present invention.

Lastly, the dough sheet must have cohesive properties which permit the surface or surfaces of the dough preform to stretch relatively uniformly when forming bubbles during frying. Heretofore, snack products having bubbles exhibited bubble formation without uniform wall thickness of the bubbles. Bubbles either formed predominantly on one side of the snack product (blisters) or were "pillows" formed through both sides of the product. A bubble formed from only one side of the fried snack piece will generally have a relatively thin bubble wall since the cellular separation is occurring adjacent the surface upon which the bubble forms. Pillows typically exhibit such exaggerated stretching of the dough surface that the walls of both sides of the snack are extremely thin. Such thin walls in bubbles absorb disproportionatly high quantities of cooking oil, increasing the overall oil content of the finished product as well as giving a greasy organoleptic quality to the finished product. Such thin walls are easily broken during normal handling prior to consumption, giving an unsightly appearance to the finished product.

A highly cohesive, non-adhesive dough can be made by adjusting the quantity of free gelatinized starch, the degree of retrogradation of the starch (thereby affecting the water absorption of a given quantity of the starch) and the concentration of any starch-complexing emulsifiers present. Researchers in the area of fabricated, fried chip products have attempted, without success, to devise a numerical measurement of dough consistencies. Applicants have found that a simple visual/manual rating scheme is useful for rating various doughs used in the production of snack food products. The "Dough Rating Scale" devised for such measurements is as follows:

1. Dry, friable, powdery dough—can be squeezed by hand into a ball only with difficulty.
2. Dry, friable—more easily squeezed into a ball.
3. Easily squeezed into a ball which breaks apart when dropped.
4. Friable, with some small agglomerates remaining after mixing.
5. Borderline friable/cohesive, discharged with ease from mixer—many random agglomerates after mixing. Hand-formed ball does not break easily when dropped.
6. Predominantly agglomerates easily molded into ball which feels wet—discharged from mixer with difficulty.
7. All large agglomerates which are discharged with difficulty from mixer—hand-formed ball does not break when dropped.
8. Completely uniform, cohesive mixture which discharges from mixer as a single non-adhesive dough.
9. Uniform adhesive dough similar to bread dough—cannot be discharged from mixer except as single unit which sticks to fingers.

Applicants have found that a dough with a rating of from 7-9 is preferable in the process of the present invention. Dough sheets (and dough preforms) made from less cohesive doughs do not appear to form continuously case hardened surfaces during the drying treatment and thus do not appear to have the ability to retain the steam generated within the chip during frying. Therefore, fewer, smaller and less consistent bubbles are formed using doughs rated 1-6. When producing potato snacks by the process of this invention, applicant has found it preferable that the major ingredient in the potato dough be a dehydrated potato flake with high water absorption capability, such as potato flakes processed without precooking and cooling steps as described in U.S. Pat. No. 2,787,553. The absorption of potato flakes can conveniently be measured by a Brabender Visco/amylo/GRAPH device in which 40 gm of dry ground potato flakes are added to 450 ml of water at 25° C., after which the temperature of the mixture is increased at 1.5° C. per minutes as the mixture is turned at constant speed. The viscosity of the resultant mixture is recorded continuously from the time the test procedure begins. The maximum reading recorded at the initial peak (which generally occurs after 4-15 minutes of hydration) is recorded as a "peak viscosity" in Brabender units (B.U.). The preferred potato flakes for use in the process of the present invention have an initial peak of from about 500 B.U. to about 800 B.U.

B. Drying of Dough Pieces.

Figure 6:
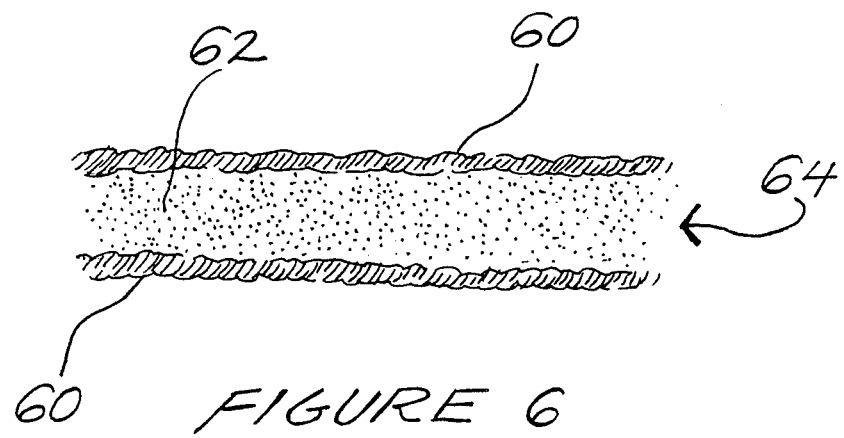
FIG. 6 is a representation of a cross-section of a dough preform treated with the process of the present invention.

The process of the present invention attempts to create that which is sought to be avoided in conventional fried chip manufacture—a relatively dry chip surface with a relatively moist inner portion. Such "case hardening" of the dough preform will result in a moisture gradient between the surface of the dough preform and the interior portion of the preform. While it is not practicable to separate a dough preform having a thickness of about 0.8 mm to measure the moisture levels of the surface as opposed to the center portions, it appears reasonable to presume that there is a gradient of moisture from the surface 60 (low) to the interior 62 (high) of the preform 64 (FIG. 6), rather than a sharp break at some point. As a result of the moisture gradient between the surface and interior portions of the dough preforms, the evaporation of moisture at the surface of the preform is somewhat retarded as the fry time increases. The vapor pressure created by the evaporation of water in the inner portion of the dough preform exceeds the cohesive ability of the dough preform to remain intact, thereby enabling the surfaces to separate from one another and forming a round, generally spherical bubble. Applicants have observed that bubbles typically form in the first few seconds after the dough preforms are immersed in the cooking oil.

Applicants have observed that while some internal expansion occurs when conventional dough pieces are fried, almost no bubbles are formed. While to some degree this may be due to the use of low water absorbent ingredients, it is believed that the relatively porous surfaces (or conversely, the lack of the case hardened exterior) permit the rapid escape of steam from the chip. The relatively uniform moisture distribution throughout the dough preform permits uniform and rapid moisture diffusion from the inner portions of the dough preform to the surface as steam is generated. Therefore, dough formulations comprising predominantly high water absorbant ingredients exhibit the qualities of the product of the present invention when subjected to the drying regime set forth herein.

Preferably, the dough pieces are fried immediately after drying so that no substantial equilibration of moisture content occurs between the relatively moist inner portion and the relatively dry surface portions of the dough preform. As described herein, the preferred process includes the drying of the dough preforms after having been cut to the desired end product shape. However, it should be understood that the process is equally susceptible to having the dough sheet dried prior to being cut into individual shapes which are thereafter fried.

Production of snack products according to the present invention is best accomplished by directing the formed dough preforms (or alternatively, the dough sheet prior to cutting) into a conveyor drier which is so positioned that immediately after exiting from the drier, the dough preforms are discharged into the fryer. Conveyor driers are well-known in the art for the dehydration of foodstuffs and for baking. Preferably, the dough pieces are carried on a foraminous belt which permits the simultaneous dehydration of both the upper and lower surfaces of the dough preform. While applicants have identified a number of methods for effecting the surface dehydration, it is apparent that any mechanism which produces the case hardened dough preforms (e.g. selective differential dehydration being greater on the surface than in the interior) is useful herein. Useful drying media include: direct impingement gas-fired drying ovens (manufactured by The Spooner Co), steam-heated conveyor dryers (Aeroglide Corp, Proctor & Schwartz Co), infrared ovens (Fostoria Ind, Inc) and microwave ovens (Raytheon Co.) and the like.

Applicants have observed the desired effects produced by the present invention when treating only one side of a dough preform. Generally speaking, bubbles will form on the side not treated by the process of the present invention. It is believed that after treating only one side of a dough preform, the treated side is case hardened and less likely to deform under the pressure of internally generated steam. Therefore, when the dough preform is fried, the non-treated side, being somewhat more pliable, will be preferentially deformed.

While the process of the present invention can be practiced on only one side of a dough preform, it is believed desirable to utilize drying equipment which induces substantially equal and simultaneous removal of moisture from both the upper and lower surfaces of the dough preform in order to achieve equal case hardening so that bubbles formed during frying will have upper and lower surfaces of relatively the same thickness. If the drying regimes on the upper and lower surfaces are not substantially equivalent, the case hardening effect on the surfaces will differ and create bubbles having walls of different thickness. In such case, the less-case hardened surface will be subject to greater expansion, therefore producing a thinner bubble wall which is more susceptible to breakage, thereby creating an unacceptable product.

While it is believed that the optimum drying conditions result from the use of both heat and high volume air movement, the present invention can be practiced by using solely heat (as with infrared heating elements), air movement, or both. While not a factor of paramount importance, the evaporative rate (measured in gm water/meter$^2$/sec) is a factor affecting commercial practicability, since a greater evaporative rate will increase throughput and require a shorter period of time being spent effecting the case hardening. Obviously, the greatest evaporative rate will occur at a relatively high temperature and relatively high rate of air movement.

In addition to the evaporative rate, the amount of water removal through the upper and lower surfaces of the dough preform will be determined by the attributes desired in the final product. Among others, such considerations include the number and size of bubbles desired, the fat content of the finished product, and the desired texture of the product. The most convenient expression of the amount of water removed from the dough preform has been found to be the reduction in water per weight unit of solids in the dough, expressed as the conventional W/S (water/solids) ratio used in dehydration technology. In the practice of this invention, a reduction in W/S during drying ranges from about 0.4 to about 0.1 within the optimum range of original dough moisture of 30% (W/S=0.429) to 55% (W/S=1.22).

Those knowledgeable in the art will recognize a number of well-known relationships that influence the selection of process conditions, such as:

1. Dough moisture versus fat content—as the moisture content of a dough preform is increased, the fat content of the finished product will increase. Therefore, a fried snack product made according to the process of the present invention will have a lower fat content than a product made from the same dough without the drying step.

2. Increased surface drying usually results in increased (and heretofore undesired) bubbling.

3. Thinner dough sheets typically exhibit less bubbling than thicker dough sheets.

4. The flexible dockering brush disclosed in U.S. Pat. No. 4,650,687 can be used in the process of this invention to minimize the formation of undesirable large bubbles or pillows that break excessively during handling. For instance, a dockering brush having flexible bristles with a diameter of for example, from about 0.020 inches to about 0.032 inches and a density of from about 100 per sq inch to about 160 per sq inch will effectively eliminate large blisters or pillows in products of the present invention.

5. Bubbling of snacks during frying is reduced by the presence of particulate solids in the dough.

C. Frying of Dough Preform.

As stated above, the frying of the case hardened dough preforms should occur as soon as practicable after drying in order to maintain the moisture differential between the surface and interior of the dough preform. The drying apparatus is preferably situated so that it discharges the dough preforms directly onto an infeed conveyor of a continuous fryer, resulting in a transit time of less than about five seconds between the drying apparatus and the fryer. Preferably, the dough preforms are dropped into the fryer such that they are immediately and totally immersed in the frying oil, which is maintained at from about 148° C. (325° F.) to about 205° C. (400° F.). The dough pieces will tend to rise after approximately 2–3 seconds due to the evolution of bubbles and thereafter float on the surface of the frying oil. Thereafter, the preforms are preferably held under the surface of the frying oil with a submerging belt until the final moisture content of the fried snack piece is about 1–2%. While the product of the present invention can be manufactured using a "float frying" apparatus as set forth in the '687 patent, applicant has observed that bubbles formed therein were not as uniform in wall thickness as was the case when the dough preform was immediately and totally immersed in the frying oil. It is believed that the difference in bubble architecture is due to the lower rate of heat transfer on the lower side of the dough preform during the initial float frying section.

D. Process Conditions.

The following process conditions are deemed desirable in the practice of the present invention.

1. Dough Consistency: A dough having a Dough Rating Scale of from 7–9 as set forth above.

2. Initial moisture content of the dough and the dough preform of between about 30% to about 55%, or stated differently, from about 0.43 to about 1.22 parts of water per part of solid by weight (W/S).

3. Moisture loss expressed as W/S (weight of water per weight of bone dry solids) of from about 0.1 to about 0.35 W/S from one or both of the upper and lower surfaces of the dough preform.

4. Air velocity is deemed desirable but is not required for the practice of this invention; rate ranges have not been determined as the optimum air movement is a function of the other process parameters.

5. Temperature of at least 93° C. (200° F.)

6. Drying time of between 10 to about 45 seconds.

7. Use of a foraminous conveyor belt to convey the dough preforms through the drying chamber to permit equivalent evaporation from both surfaces of the dough preform.

8. No equilibration of the dough preforms between the drying chamber and the fryer.

Extensive experimentation was done to quantify the parameters of the present invention. As used in Tables 1–7, the following parameters were measured:

Moisture, %—Initial dough moisture was calculated from the moisture content of each of the dry ingredients and the added water.

Thickness, mm—Randomly selected 2.8 cm diameter dough pieces were taken from the dough sheet and thickness measurements taken with a Starrett model 1015MB-881 caliper with a 19.0 mm diameter measuring foot. Numerous samples were taken and averaged for the single number shown.

Dockering—Samples dockered with the flexible brush dockering unit are identified with an asterisk behind the sample letter.

Retention time, seconds—The time the dough preforms were exposed to the treatment.

Temperature, °F.—For hot air drying, temperature was recorded by conventional thermocouples placed in the air stream immediately above the dough preforms. For infrared heating the energy input is expressed as watts per square foot.

Air flow—Where applicable, units are in feet per minute.

Final moisture, %—The moisture content of the surface dried dough preforms as measured by CEM AVC-80 moisture analyzer.

4% moisture—The reduction in moisture content expressed on as-is basis.

$H_2O$ loss, ($\Delta W/S$)—Reduction in amount of water per unit solid (pounds of water per pound of solids) in the dried dough preforms.

Evaporative rate—The rate of moisture evaporation in grams of moisture per square meter of dough sheet per second. For this calculation the specific gravity of sheeted potato doughs (1.25) and of corn doughs (1.28) was used to calculate the weight of one square meter of dough sheet with the observed thickness. For example, sample A of Table 3, 1 meter of dough 0.72 mm thick is calculated to weigh 900 gm. With the reduction of the moisture content known, the evaporation from this dough sheet was 121.4 gm. The evaporative rate is obtained by dividing total evaporation by 2 (for each side of the dough sheet) and then by the heating period, (18 seconds) resulting in a rate of 3.37 gm of $H_2O$ evaporated/sq meter/second.

Frying time, seconds—Total fry time in cooking oil held at 325° F. (162° C.)-350° F. (178° C.).

Figure 2:
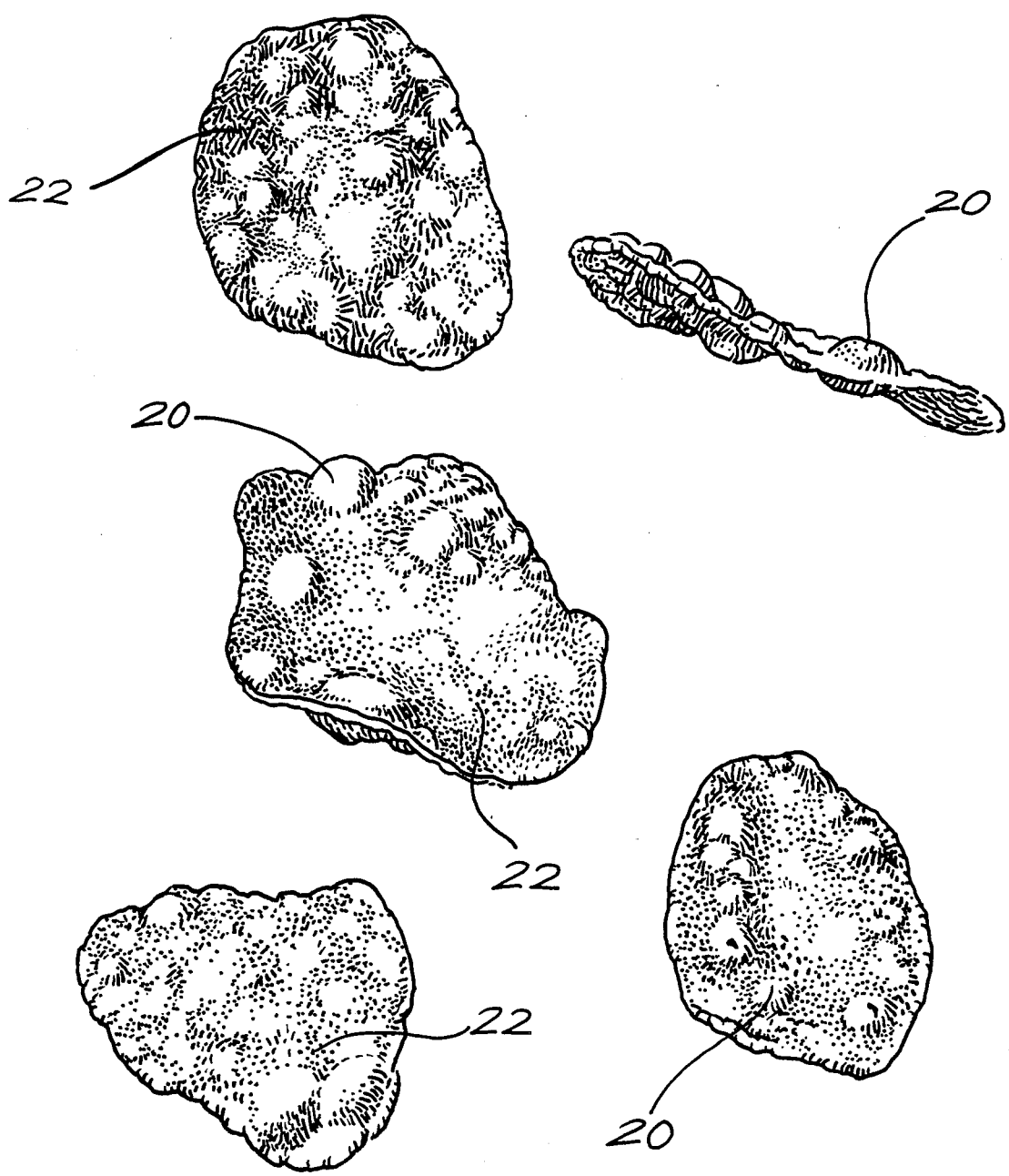
FIG. 2 is a representation of a bubbled chip in category #2 as described herein.
Figure 3:
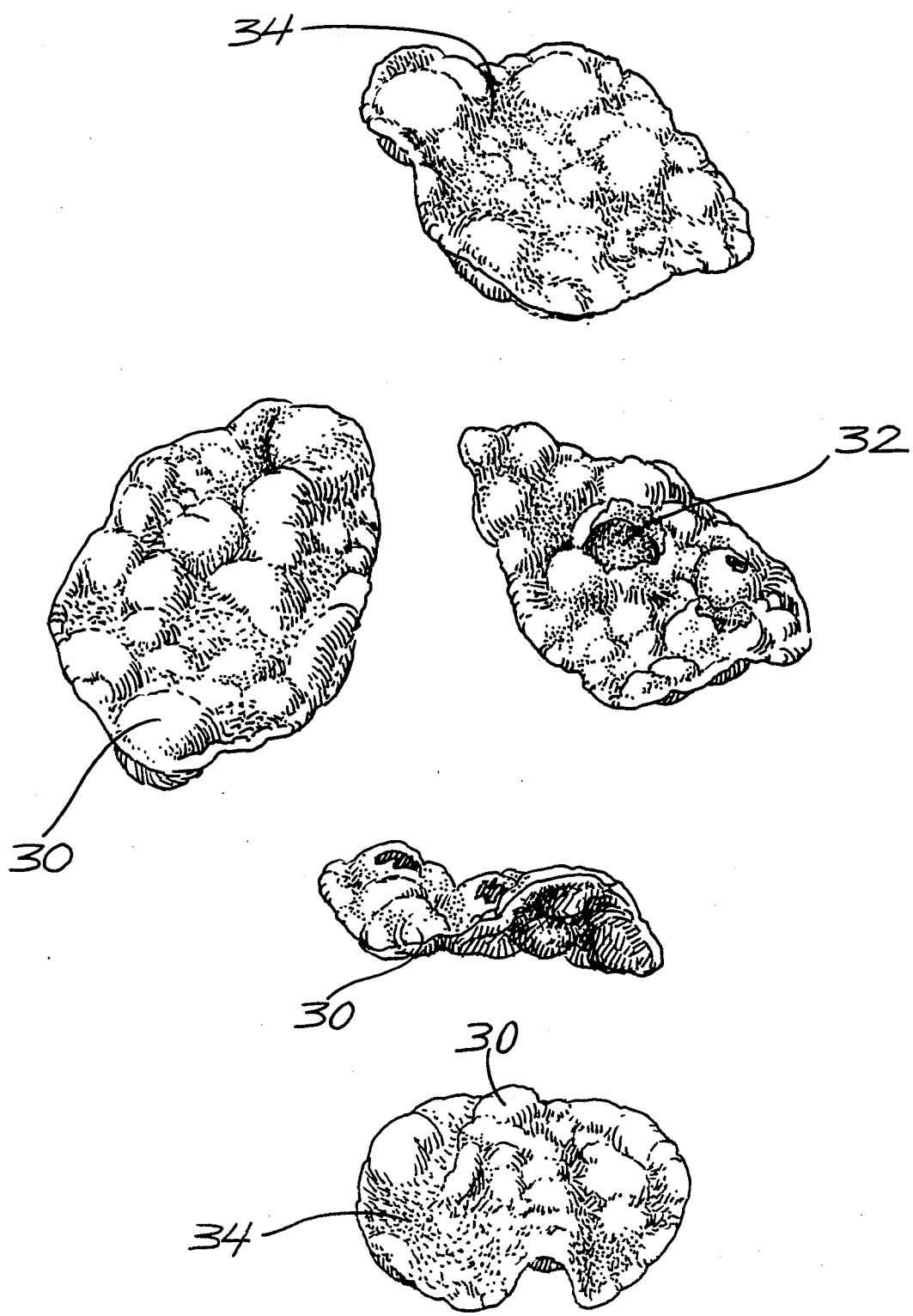
FIG. 3 is a representation of a bubbled chip in category #3 as described herein.
Figure 4:
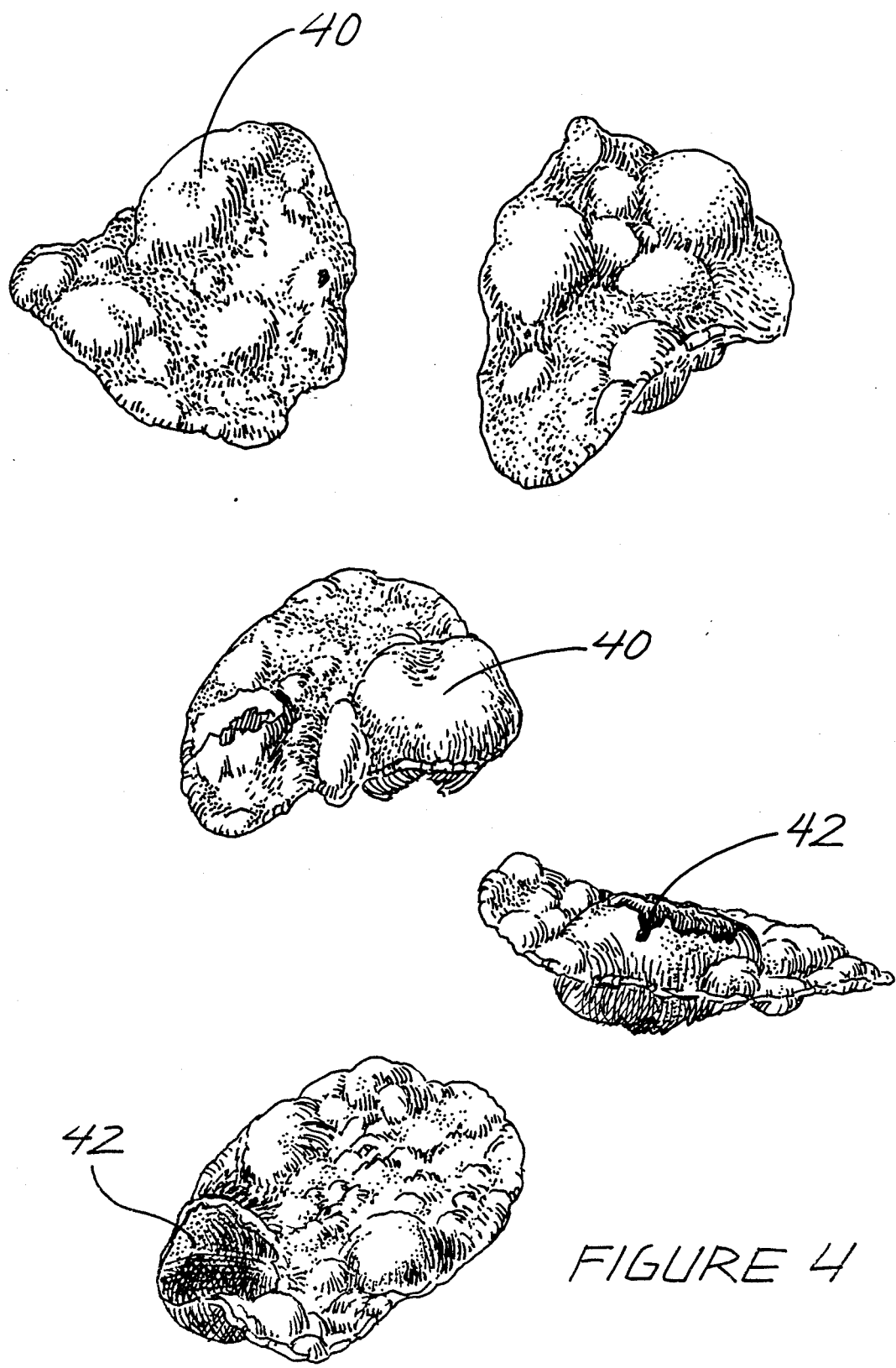
FIG. 4 is a representation of an unacceptably bubbled chip in category #4 as described herein.
Figure 5:
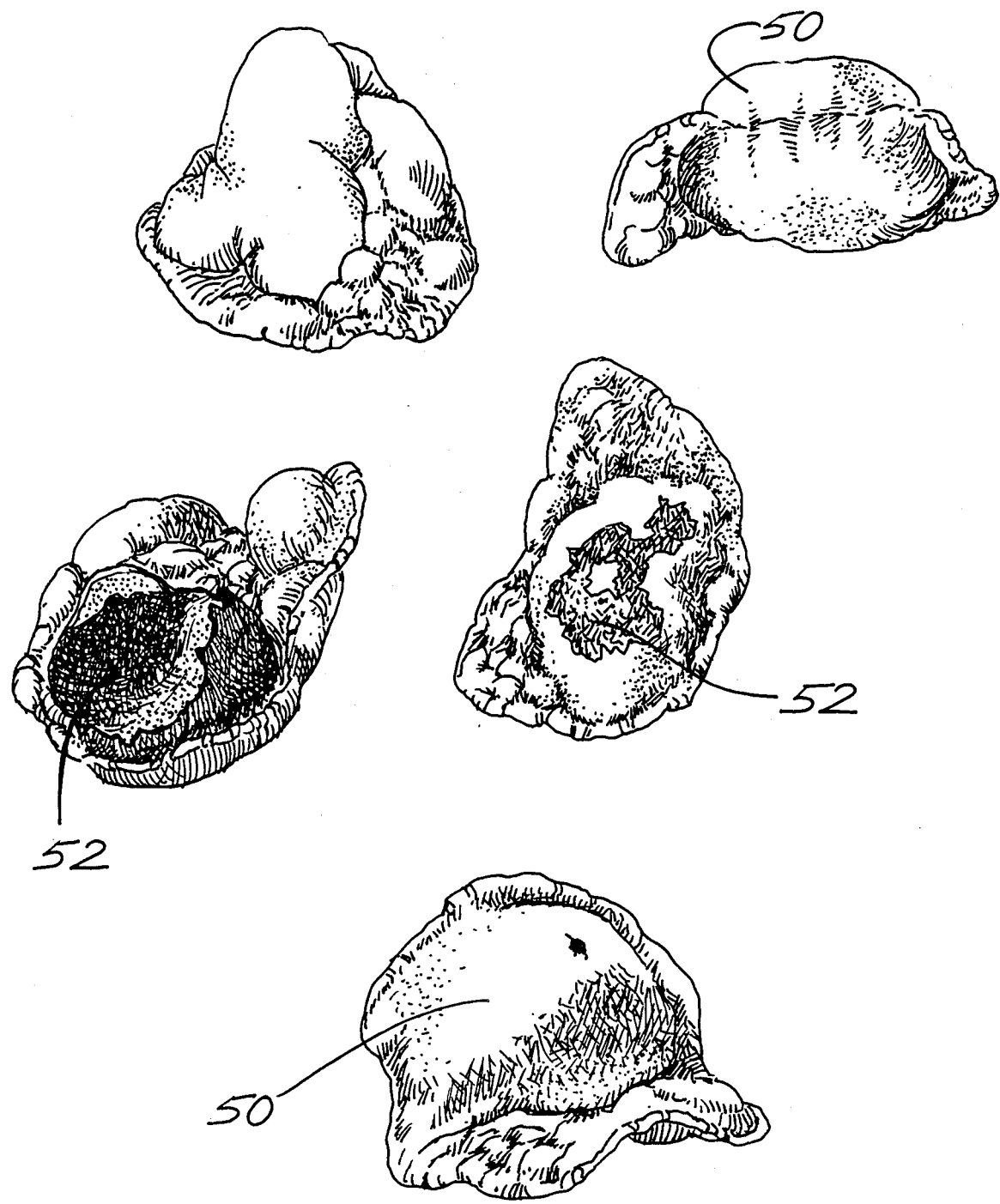
FIG. 5 is a representation of an unacceptably bubbled chip in category #5 as described herein.

Bubble size distribution—A five point bubble scale evaluation was adapted in order to rate chips produced by the process of the present invention. The process of the instant invention can be adjusted to produce products ranging from those having very little bubbling to products which are totally pillowed. By adjusting the initial dough moisture, the thickness of the dough sheet and the drying environment (time, temperature, air flow), a chip product having any desired bubble size distribution can be created. The categories set forth below describe a chip-type determined by the bubbles appearing thereon.

a. Category #1—As shown in FIG. 1, chips having no bubbles greater than 6 mm are category #1 chips. The chips typically have a number of small bubbles 10 and significant areas of the chip surface 12 are unbubbled. Because the process of the present invention is intended to create bubbles, a chip classified as category #1 is not preferred—the chips resemble conventional sheeted snacks since the chip surface is not noticably bubbled.

b. Category #2—As shown in FIG. 2, chips which are lightly bubbled (either one large ($\leq 2.5$ cm) bubble or a few small bubbles) over less than one-half of the chip surface are category #2 chips. The bubbles 20 characteristic of category #2 chips are relatively small but quite noticeable and withstand breakage during normal packaging and handling. Large areas 22 of the chip surface are not bubbled. Category #2 chips are acceptable, however it is desirable to have at least a portion of the chips in category #3 in order to have some more noticeable bubbles.

c. Category #3—As shown in FIG. 3, category #3 chips have more than half of their surface covered with bubbles, with the maximum bubble size being 2.5 cm. Such relatively large bubbles 30 may be broken, as at 32, but such broken bubbles are relatively rare. A significant portion 34 of the chip surface is not bubbled. Category #3 chips, along with category #2 chips, are preferred products of the process of this invention.

d. Category #4—As shown in FIG. 4, category #4 chips have bubbles 40 larger than 2.5 cm in diameter, many of which are broken, as at 42. Such large bubbles are objectionable not only because they are frequently broken, but also because they usually substantially increase the fat content of the chips.

e. Category #5—As shown in FIG. 5, category #5 chips have large pillows 50 which are usually broken, as at 52, after normal handling. Such pillows typically consume a major portion of the chip. Such chips are totally unacceptable because of their appearance and fat content. Applicants have determined that processing conditions which produce chips in category #5 must be changed to eliminate the possibility of such chips.

Bubble Factor (BF) Index—The weighted average of the total bubble size distribution of a quantity of chips made according to the process of the present invention. This index is calculated by assigning a value of 0 for the category #1 chips, a value of 0.25 for category #2 chips, a value of 0.50 for category #3 chips, a value of 0.75 for category #4 chips, and a value of 1.00 for category #5 chips. It is believed that a BF Index of between about 40 and 55 indicates desirable products. However, the BF Index can not be used alone to predict overall product acceptability.

Percent fat—The fat content of the finished snacks expressed on an as-is basis.

Product Score—A weighted evaluation of the effect of the drying environment. The score is based on evaluations of the two major quality factors involved in this process—bubble size distribution, and fat content. (1) Scores were assigned to the five categories in the bubble distribution analysis according to known consumer responses. For example, because the intent of the instant invention is to induce bubbling, chips classified in category #1, being unbubbled, received no score, although such snacks might be acceptable in other respects. Category #3 chips exhibited maximum appearance and textural distinction and hence received a maximum score relative to the amount of bubbles created. Category #4 and #5 chips present disadvantageous appearance due to breakage and exhibit increased fat content. (2) The scores for fat content reflect consumer preferences for snacks that are tender and not greasy to the touch, hence the highest score of 30 points for the 27-30% fat range. Lower fat content chips achieved lower scores but no negative penalties. High fat content chips received lower scores because of perceived greasiness. A negative score is used for snacks with a fat content of 40% or higher because of excessive greasiness, which, at this range, will separate from the snacks and drain into the container. The scores are awarded according to the following table:

| Bubble Size Distribution (maximum 70 points) | | |
|---|---|---|
| Chip Category | Percentage of Chips Within Category | Points |
| #1 | | 0 |
| #2 | 1-25% | 10 |
|  | 26-50% | 20 |
|  | 51-75% | 30 |
|  | 76-100% | 50 |
| #3 | 1-25% | 20 |
|  | 26-50% | 30 |
|  | 51-75% | 40 |
|  | 76-100% | 60 |
| #4 | 1-5% | −5 |
|  | 6-10% | −10 |
|  | over 10% | −20 |
| #5 | 1-5% | −10 |
|  | 6-10% | −20 |
|  | over 10% | −40 |

| Fat Content, % (Maximum 30 points) | |
|---|---|
|  | Points |
| 23 or less | 5 |
| 24 to 26 | 20 |
| 27 to 30 | 30 |
| 31 to 34 | 20 |
| 35 to 39 | 5 |
| over 40 | −10 |

The product score is generated by adding the appropriate Bubble Size Distribution points to the Fat Content points. The resulting number reflects an analytical assessment of chips wherein a higher product score number indicates a more desirable chip than a lower product score. It is believed that a product score of at least 60 is necessary for a commercially practicable product with a score of 70 or more being preferable, and a score of over 80 being most preferable.

EXAMPLES

Example I

A number of preliminary small scale batch experiments were made to demonstrate the validity of the proposed method of surface drying for creating a product having controlled bubbling. For these tests a sheeted snack was made from a basic formula containing about 64% high absorption potato flakes, 5% raw potato starch, 16% ground dehydrated potatoes (passing through a 420 micron screen), 7.5% ground dehydrated potatoes (passing through a 1.19 mm screen), 3% sugar, 1% salt, 0.7% MSG and about 3% of minor flavoring ingredients. The dry ingredients were placed in a 40 liter Stephan mixer and blended with 0.2% monoglyceride emulsifier and 0.4% vegetable oil. Water of 120° F. (49° C.) was added over a period of 30 seconds with the mixer running, with mixing continuing for 15 seconds. The amount of water was adjusted to give a calculated dough moisture of 52%. The consistency of the dough was rated 9.

The dough was fed manually to a set of 6.5 inch diameter sheeting rolls set to produce a sheet having a thickness of about 1.2 to 1.3 mm. This sheet was fed to a second set of similar rolls to give a final thickness of 0.76 mm. The dough sheet was conveyed at approximately 13 feet (3.96 meters) per minute under a flexible bristle dockering brush, independently driven, and turning at a speed to give a tip velocity of approximately 11 feet (3.35 meters) per minute. The dockering brush was mounted so that it could be quickly raised or lowered depending on whether dockering was desired. The dough sheet then passed under a rotary cutter, also independently driven but moving at approximately the same speed as the belt carrying the dough sheet. The cutter produced three sizes of an irregular potato chip-like shape. The dough pieces were processed to illustrate the effect of the inventive process, as follows:

A. Effect of Dockering.

Samples A and A* were made by the process set forth above without any surface drying prior to frying. The dough preforms were dropped into a conventional batch fryer, stirred gently and fried at 350° F. (178° C.) to a final moisture content of below 2%. Sample A was not dockered prior to cutting, sample A* was dockered to the extent that normal potato snacks made by this process were treated. Table 1 illustrates that the expected decrease in relatively large perceptible bubbles (#3 and larger) decreases when the dough preform is dockered.

B. Effect of Drying at 250° F. (121° C.)

Dough preforms were removed from the belt after dockering and placed on perforated metal trays which were in turn placed in a laboratory model Proctor & Schwartz gas-fired hot air dryer. The hot air temperature was controlled at 250° F. (121° C.) and air was directed across the surface of the pieces. Sample B* of Table 1 was dried for 5 seconds, Sample C* for 10 seconds, sample D* for 15 seconds and sample E* for 30 seconds.

C. Effect of Drying at 300° F. (150° C.)

Samples F* and G* were treated as in B above, except that the dryer was operated at 300° F. (150° C). Sample F* was dried for 5 seconds and sample G* was dried for 30 seconds.

D. Effect of Hydration of Ingredients.

To determine the effect of hydration, dough preforms were removed from the sheeting line prior to dockering or treatment and fried in the batch fryer. Sample H1 was collected from a newly mixed batch of dough, sample H2 was collected after a lay time of about 7 to 8 minutes, and sample H3 was collected after a lay time of about 15 minutes.

The coarse, crushed, dehydrated potatoes (about 7.5% of the total) act as a particulate solid in the dough sheet which, as in the case of tortilla chips, can protrude through the surface of the dough and serve as "vents" to permit the escape of steam during frying, thus reducing the tendency to form bubbles. The #3 bubbles decreased as the dough was held due to the gradual hydration of the relatively large particulate dehydrated potato particles (+0.8 mm), demonstrating the importance of rehydration of particulate solids in the dough if bubbling is to be induced.

E. Effect of Dough Thickness.

The effect of dough thickness on the distribution and size of bubbles produced from the same dough without drying was determined. Samples J* and K* were produced by opening the second set of sheeting rolls to give a sheet thickness of 0.85 mm and 0.90 mm respectively. These thicker dough sheets were dockered as set forth above, cut and fried without prior heat treatment in the batch fryer. Increasing the thickness from 0.85 mm to 0.90 mm resulted in a predictable increase in quantity of larger bubbles.

F. Effect of Hot Air vs Infrared Drying.

A portion (sample L*) of the dockered dough preforms were passed, by means of a wire mesh belt, under a series of 13 infrared heaters, 4 of which were rated at 900 watts with 9 rated at 1600 watts. These heaters were mounted approximately 2 inches (5.08 cm) above the belt and the speed of the belt was controlled so that the dough preforms remained under the heaters for 25-27 seconds.

The heated pieces were deposited onto the surface of the frying oil in a float frying section whereupon they immediately passed through a series of ripples for a total of 10 seconds before dropping into the conventional, continuous snack fryer. The pieces were thus fried at a temperature of about 345° F. (174° C.) for 45-50 seconds.

fryer. When using a float fryer as described in U.S. Pat. No. 4,650,687, the flow of oil was adjusted to provide a turbulent submersion in order to fry both the upper and lower surfaces of the preform at approximately the same rate. The approximate residence time in the float section was about 8 seconds, after which the pieces were dropped into a conventional fryer and fried for a total of from 31 to 38 seconds. Results are shown in Table 2. Observations are as follows:

1. The fat content of the fried snack is directly related to the moisture content of the dough preform, i.e. the highter the moisture content, the higher the fat absorbed during frying.

2. The degree of bubbling is directly related to the moisture content of the dough preform.

3. The use of the dockering brush eliminated the larger bubbles in sample C*.

TABLE 1

| | DOUGH SHEET | | HEAT TREATMENT | | | SURFACE DRIED PIECES | | | | FRIED PRODUCT | | | | | | | | |
|---|---|---|---|---|---|---|---|---|---|---|---|---|---|---|---|---|---|---|
| | | | Reten | | | | | | | Fry | Bubble Size Distribution | | | | | | | Pro- |
| Sample | Moist % | Thick mm | Time-sec | Temp °F. | Air fpm | Moist % | Δ % M | H₂O Loss | Evap Rate | Time Sec | 1 % | 2 % | 3 % | 4 % | 5 % | BF Index | Fat % | duct Score |
| A | 52.0 | 0.71 | | | | Not Applicable | | | | 45 | 0 | 50 | 50 | 0 | 0 | 38 | 44.2 | 40 |
| A* | 52.0 | 0.71 | | | | Not Applicable | | | | 45 | 22 | 78 | 0 | 0 | 0 | 20 | 41.1 | 40 |
| B* | 52.0 | 0.71 | 5 | 250 | 300 | Not Measured | | | | 45 | 0 | 78 | 22 | 0 | 0 | 31 | 43.5 | 60 |
| C* | 52.0 | 0.71 | 10 | 250 | 300 | Not Measured | | | | 45 | 0 | 58 | 42 | 0 | 0 | 36 | 43.7 | 50 |
| D* | 52.0 | 0.71 | 15 | 250 | 300 | Not Measured | | | | 45 | 0 | 26 | 74 | 0 | 0 | 44 | 42.2 | 50 |
| E* | 52.0 | 0.71 | 30 | 250 | 300 | Not Measured | | | | 45 | 0 | 0 | 100 | 0 | 0 | 50 | 43.0 | 50 |
| F* | 52.0 | 0.71 | 5 | 300 | 300 | Not Measured | | | | 45 | 9 | 85 | 6 | 0 | 0 | 24 | 41.9 | 60 |
| G* | 52.0 | 0.71 | 30 | 300 | 300 | Not Measured | | | | 45 | 0 | 9 | 85 | 6 | 0 | 45 | 41.5 | 60 |
| H1 | 52.0 | 0.71 | | | | Not Applicable | | | | 45 | 0 | 58 | 42 | 0 | 0 | 36 | 44.4 | 50 |
| H2 | 52.0 | 0.71 | | | | Not Applicable | | | | 45 | 0 | 82 | 18 | 0 | 0 | 30 | 45.7 | 60 |
| H3 | 52.0 | 0.71 | | | | Not Applicable | | | | 45 | 0 | 100 | 0 | 0 | 0 | 25 | 42.4 | 40 |
| J* | 52.0 | 0.85 | | | | Not Applicable | | | | 45 | 40 | 60 | 0 | 0 | 0 | 15 | 43.9 | 20 |
| K* | 52.0 | 0.90 | | | | Not Applicable | | | | 45 | 27 | 73 | 0 | 0 | 0 | 18 | 41.2 | 20 |
| L*(a) | 52.0 | 0.75 | 26 | NA | NA | 46.0 | 6.0 | 0.232 | 4.01(b) | 45 | 0 | 1 | 97 | 2 | 0 | 50 | 34.8 | 75 |

(a) Infrared heaters, 2260 watts/ft² at 2.75 inches distance.
(b) Calculated based on heat treatment for one side.

TABLE 2

| | DOUGH SHEET | | FRIED PRODUCT | | | | | | | | |
|---|---|---|---|---|---|---|---|---|---|---|---|
| | | | | Bubble Size Distribution | | | | | | | |
| Sample | Moist % | Thick mm | Fry Time Sec | 1 % | 2 % | 3 % | 4 % | 5 % | BF Index | Fat % | Product Score |
| C | 50.0 | .74 | 38 | 1 | 41 | 57 | 2 | 0 | 40 | 42 | 55 |
| E | 45.0 | .76 | 38 | 100 | 0 | 0 | 0 | 0 | 0 | 29 | 30 |
| B | 40.0 | .79 | 31 | 100 | 0 | 0 | 0 | 0 | 0 | 30 | 30 |
| C* | 50.0 | .74 | 38 | 17 | 83 | 0 | 0 | 0 | 21 | 43 | 40 |
| E* | 45.0 | .76 | 38 | 100 | 0 | 0 | 0 | 0 | 0 | 34 | 20 |
| B* | 40.0 | .79 | 31 | 100 | 0 | 0 | 0 | 0 | 0 | 29 | 30 |

Example II

A mixture of dry ingredients was prepared as in Example 1, then blended with emulsifier and oil in the Stephan mixer. Water of 70° F. (21° C.) was added during 25 seconds of mixing, the mixing then continuing for a total of 35 seconds. The amount of water added was adjusted for samples C, E and B to give a calculated dough moisture of 50.0%, 45.0% and 40.0% respectively, including the water originally present in the dry ingredients. The consistency of the three doughs produced were rated 9, 9 and 7 respectively. The doughs were sheeted as in Example I to yield final dough thickness of 0.74 mm to 0.79 mm. Each dough sheet was conveyed at 21.4 ft (6.52 m) per minute to a rotary cutter which produced three sizes of an irregular potato chip-like shape. The dockering brush was lowered for samples C*, E* and B*, in order to determine the effect of dockering on the bubbling of the finished product. The cut pieces were deposited in the intake of a float

Example III

A dough sheet was prepared as in Example II, adjusted for various dough moistures. However, all the cut dough preforms were subjected to drying on both sides of the preforms immediately prior to frying. An experimental convection oven was obtained from the Spooner Company and installed between the sheeter discharge and the feed conveyor to the frying installation.

The oven comprised a three zone, gas-fired forced air convection oven typical of those used in the baking industry. Plenums and dampers above and below the wire mesh belt permitted control of air velocity and direction of flow on both sides of the belt.

Observations from the results of Table 3 are as follows:

1. Extent of bubbling. Except for sample D (which had an original low moisture content of 40%), the extent of bubbling is significantly greater when the surface moisture is reduced by drying prior to frying.

2. The moisture content of the dough prior to drying controls the degree and size of bubbles as well as the fat content.

3. Dockering the dough prior to drying significantly reduced the extent of bubbling, particularly in the production of large undesirable bubbles (categories #4 and #5).

liter Stephan mixer and blended with 0.2% monoglyceride emulsifier and 0.4% vegetable oil. Water at 120° F. (49° C.) was added over a period of 30 seconds with the mixer running, and mixing continued 15 seconds thereafter for a total of 45 seconds. The amount of water was adjusted to give a calculated dough moisture of 45%. The consistency of the dough was rated 7.

A dough sheet having a thickess of 0.76 mm was conveyed under the dockering roll and rotary cutter of

TABLE 3

| | DOUGH SHEET | | HEAT TREATMENT | | | | | | | FRIED PRODUCT | | | | | | | | |
|---|---|---|---|---|---|---|---|---|---|---|---|---|---|---|---|---|---|---|
| | | | Reten | | | SURFACE DRIED PIECES | | | | Fry | Bubble Size Distribution | | | | | | | Product |
| Sample | Moist % | Thick mm | Time-sec | Temp °F. | Air fpm | Moist % | Δ % M | H₂O Loss | Evap Rate | Time Sec | 1 % | 2 % | 3 % | 4 % | 5 % | BF Index | Fat % | Score |
| A | 50.0 | .72 | 18 | 550 | 400 | 42.2 | 7.8 | 0.270 | 3.37 | 36 | 0 | 0 | 33 | 46 | 21 | 72 | 38 | 0 |
| H | 45.0 | .73 | 18 | 550 | 400 | 36.8 | 8.2 | 0.236 | 3.29 | 29 | 0 | 11 | 82 | 8 | 0 | 50 | 23 | 65 |
| D | 40.0 | .80 | 18 | 550 | 400 | 30.4 | 9.6 | 0.230 | 3.83 | 23 | 100 | 0 | 0 | 0 | 0 | 0 | 22 | 5 |
| A* | 50.0 | .72 | 18 | 550 | 400 | 42.2 | 7.8 | 0.270 | 3.37 | 36 | 0 | 0 | 82 | 11 | 8 | 57 | 35 | 35 |
| H* | 45.0 | .73 | 18 | 550 | 400 | 37.5 | 7.5 | 0.218 | 3.04 | 29 | 9 | 74 | 17 | 0 | 0 | 27 | 27 | 80 |
| D* | 40.0 | .80 | 18 | 550 | 400 | 31.0 | 9.0 | 0.217 | 3.26 | 23 | 100 | 0 | 0 | 0 | 0 | 0 | 22 | 5 |

Example IV

A dough of Example II having 45% moisture was prepared and subjected to drying environments having various combinations of minimum/maximum air flow with 300° F. or 550° F. (150° C. or 289° C.) temperatures.

Observations from the results of Table 4 are as follows:

1. The evaporative rate increased as expected as the drying conditions were intensified (maximum air flow and hotter temperature).

2. The loss of water per pound of solids (water loss) increased as drying conditions intensified.

3. Maximum air flow more significantly affected the rate of mass transfer of water from the surface of the dough preform than did temperature.

4. The flexible dockering brush affords excellent control of excessive bubbling.

Example I, to produce hexagonal-shaped dough preforms.

A first portion of dough preforms (sample A*) were fed by a wire mesh belt directly into the intake end of a conventional fryer. The dough preforms dropped into the frying oil from a height of approximately 2 inches, were immediately submerged in the hot oil then rose to the surface in about 2–3 seconds. The preforms floated on top of the oil for 3–4 seconds before being engaged by paddles which submerged the pieces in oil to be directed under a hold down belt for the remainder of the totl fry time of 52 seconds.

A second portion of dough preforms (sample B*) was subjected to surface drying treatment by passing them on a wire mesh belt through an enclosed chamber fitte with two open flame gas burners, one at each end of the chamber under the belt, and with a fan mounted above the belt in the center so that heated air was forced down through the belt in the center and back through the belt

TABLE 4

| | DOUGH SHEET | | HEAT TREATMENT | | | | | | | FRIED PRODUCT | | | | | | | | |
|---|---|---|---|---|---|---|---|---|---|---|---|---|---|---|---|---|---|---|
| | | | Reten | | | SURFACE DRIED PIECES | | | | Fry | Bubble Size Distribution | | | | | | | Product |
| Sample | Moist % | Thick mm | Time-sec | Temp °F. | Air fpm | Moist % | Δ % M | H₂O Loss | Evap Rate | Time Sec | 1 % | 2 % | 3 % | 4 % | 5 % | BF Index | Fat % | Score |
| E | 45.0 | .76 | | | | Not Applicable | | | | 38 | 100 | 0 | 0 | 0 | 0 | 0 | 29 | 30 |
| G | 45.0 | .77 | 18 | 550 | 150 | 40.4 | 4.6 | 0.140 | 2.06 | 35 | 0 | 24 | 76 | 1 | 0 | 45 | 28 | 95 |
| F | 45.0 | .74 | 18 | 300 | 400 | 39.6 | 5.4 | 0.163 | 2.30 | 36 | 0 | 0 | 75 | 19 | 7 | 59 | 27 | 30 |
| H | 45.0 | .73 | 18 | 550 | 400 | 36.8 | 8.2 | 0.236 | 3.29 | 29 | 0 | 11 | 82 | 8 | 0 | 50 | 23 | 65 |
| E* | 45.0 | .76 | | | | Not Applicable | | | | 38 | 100 | 0 | 0 | 0 | 0 | 0 | 34 | 20 |
| G* | 45.0 | .77 | 18 | 550 | 150 | 41.0 | 4.0 | 0.123 | 1.81 | 35 | 70 | 30 | 0 | 0 | 0 | 8 | 30 | 50 |
| F* | 45.0 | .74 | 18 | 300 | 400 | 38.8 | 6.2 | 0.184 | 2.60 | 36 | 37 | 62 | 0 | 0 | 0 | 16 | 28 | 60 |
| H* | 45.0 | .73 | 18 | 550 | 400 | 37.5 | 7.5 | 0.218 | 3.04 | 29 | 9 | 74 | 17 | 0 | 0 | 27 | 27 | 80 |

Example V

A mixture of dry ingredients containing about 57% high absorption potato flakes, 15% raw potato starch, 12.5% ground dehydrated potatoes (passing through a 420 micron screen), 7.5% ground dehydrated potatoes (passing through a 1.19 mm screen), 3% sugar, 0.6% salt, 0.4% MSG and about 3% minor flavoring ingredients was made. The dry ingredients were placed in a 40 at each end, thus subjecting both sides of the preforms to heated air (280° F.–300° F. 139° C.–150° C.) for 12 seconds, rsulting in a calculated evaporation rate of 3.2 gm H₂O/sq meter/second. Immediately after exiting the drying chamber the preforms were fried as were sample A*, except that the fry time was reduced to 44 seconds because of the lower moisture content. The increased bubbling in the treated dough preforms is apparent in Table 5.

TABLE 5

| Sample | DOUGH SHEET Moist % | DOUGH SHEET Thick mm | HEAT TREATMENT Reten Time-sec | HEAT TREATMENT Temp °F. | HEAT TREATMENT Air fpm | SURFACE DRIED PIECES Moist % | SURFACE DRIED PIECES Δ % M | SURFACE DRIED PIECES H$_2$O Loss | SURFACE DRIED PIECES Evap Rate | FRIED PRODUCT Fry Time Sec | FRIED PRODUCT Bubble Size Distribution 1 % | 2 % | 3 % | 4 % | 5 % | BF Index | Fat % | Product Score |
|---|---|---|---|---|---|---|---|---|---|---|---|---|---|---|---|---|---|---|
| A* | 45.0 | .77 | | | Not Applicable | | | | | 52 | 43 | 57 | 0 | 0 | 0 | 14 | 26.2 | 50 |
| B* | 45.0 | .75 | 12 | 300 | 250 | 40.2 | 4.8 | 0.146 | 3.17 | 44 | 6 | 94 | 0 | 0 | 0 | 24 | 25.2 | 70 |

Example VI

Doughs were made using cooked corn and commercially available corn masa flour. The first dough (samples A* and B*) was made with about 9 pounds of a premix containing about 34% waxy maize starch, 25% precooked corn flour, 14% pre-gelatinzed rice flour, 15% corn germ, 2.5% sugar, 2.5% salt, 6% vegetable oil and 0.7% monoglyceride emulsifier, about 22 pounds of ground cooked whole corn containing approximately 50% moisture and 4 pounds of cold water. The mixer was blended in a Stephan 40 liter VCM mixer at a low speed for approximately 45 seconds. The dough had a calculated moisture content of 46.5% and a consistency rating of 7.

A second dough (samples C* and D*) was made with about 43% of the premix above and about 57% of dry corn masa flour. Cold water was added to give 46.5% moisture in the dough and the mixture was blended in a Stephan mixer for 45 seconds. The dough had a consistency rating of 9.

All of these doughs were sheeted (to a thickness of approximately 0.85 mm) and dockered according to Example I. The dough sheet was cut with a plastic triagle-shaped cutter driven at approximately the same speed as the belt.

A first portion of the dough preforms (A* and C*) were fed by wire mish belt into the float fryer of Example I. The residence time in the float fryer was 8-10 seconds, after which the pieces are dropped into a conventional fryer for a total fry time of 42-45 seconds.

A second portion of dough preforms (samples B* and D*) were surface dried on the top side only by passing the preforms under a series of infrared heaters mounted about 2 inches above the wire mesh belt carrying the pieces. Thirteen of these heaters were mounted above the belt, 9 of which were rated at 900 watts and 4 rated at 1600 watts. The retention time of the dough preforms under the heaters was 13-20 seconds. After heating the preforms were fed into the free float section and then into the regular fryer as with the untreated samples. Total fry time varied from 42-49 seconds.

The results (Table 6) demonstrate that surface heating can induce desired levels of bubbling with sheeted corn snacks as well as sheeted potato snacks. The reduced level of bubbles is attributable to the fact that only one side of the dough preform was treated. As before, the treated doughs had a significantly higher level of chips in category #2 than did the untreated samples. The heat treatment restricted the size of the bubbles so that none of the objectionable category #4 or #5 chips were produced.

Sample D* did not have as great an increase in bubbling even though heated more than sample B*. This was due to the presence of more large corn particles in the corn masa flour which reduced the degree of bubbling in this sample.

TABLE 6

| Sample | DOUGH SHEET Moist % | DOUGH SHEET Thick mm | HEAT TREATMENT Reten Time-sec | SURFACE DRIED PIECES Moist % | SURFACE DRIED PIECES Δ % M | SURFACE DRIED PIECES H$_2$O Loss | SURFACE DRIED PIECES Evap Rate | FRIED PRODUCT Fry Time Sec | Bubble Size Distribution 1 % | 2 % | 3 % | 4 % | 5 % | BF Index | Fat % | Product Score |
|---|---|---|---|---|---|---|---|---|---|---|---|---|---|---|---|---|
| A* | 46.5 | .83 | | Not Applicable | | | | 45 | 82 | 18 | 0 | 0 | 0 | 5 | 31.7 | 30 |
| B*(a) | 46.5 | .84 | 13 | 45.7 | 0.8 | 0.028 | 1.22 | 49 | 35 | 65 | 0 | 0 | 0 | 16 | 30.6 | 60 |
| C* | 46.5 | .83 | | Not Applicable | | | | 42 | 88 | 12 | 0 | 0 | 0 | 3 | 30.4 | 40 |
| D*(a) | 46.5 | .85 | 20 | 43.7 | 2.8 | 0.093 | 2.71(b) | 42 | 62 | 38 | 0 | 0 | 0 | 10 | 28.2 | 50 |

(a) Infrared heaters, 2260 watts/ft$^2$ at 2.25 inches distance
(b) Calculated based on heat treatment for one side

Example VII

Approximately 22 pounds of a premix containing approximately 36% high absorption potato flakes, 12.5% potato granules, 37% potato starch, 7.5% ground dehydrated potatoes, 2% sugar, 0.6% salt, 0.5% vegetable oil, 0.2% monoglyceride emulsifier and minor amounts of flavoring materials was combined with an amount of water sufficient to yeild a 44% moisture dough. The mixing was accomplished in about 2 minutes in a Hobart 60-quart planetary type mixer with paddle stirrer on medium speed and the resulting dough was sheeted to a thickness of about 0.75 mm as in Example I.

A first portion of sheeted dough (sample A) was passed, without dockering, to a rotating plastic cutter to produce dough preforms having variable, generally rounded shapes. The dough preforms were fed by means of a wire mesh belt into the intake end of a conventional snack fryer and fried for approximately 45 seconds.

A second portion of the sheeted dough (sample B*) was dockered as in Example I and cut with the same cutter, then conveyed to the fryer in the same manner as sample A.

A third portion of the sheeted dough (sample C*) was dockered and cut as in samples A and B*, but before frying was conveyed on a wire mesh belt under two 900 watt infrared heaters mounted in series about 2 inches above the belt. The speed of the belt was regulated so that the preforms remained under the heaters for about 6 seconds. Approximately 18 seconds elapsed between the heat treatment and the point at which the preforms were dropped into a conventional fryer.

A fourth portion of the sheeted dough (sample D) was dockered with a flexible bristle rotating brush as in Example I, then cut as above. The dough preforms were heat treated in the same manner as was sample A3. The preforms were treated for about 12 seconds with 4 900 watt infrared heaters.

A fifth portion of the dough (sample E*) was dockered, cut, heat treated and fried as in sample C* except that 5 infrared heaters were used and the retention time of the preforms under the heaters was increased to 15 seconds.

A sixth portion of the sheeted dough (sample F*) was dockered, cut and heat treated as in sample E* except that the infrared heaters were moved closer to the fryer so that the elapsed time between treatment and frying was reduced to 3 seconds. The pieces were fried as above.

Table 6 shows the results of laboratory tests on the samples. The following observations were made:

1. As expected, dockering greatly reduced both the size and number of bubbles in the chips. Sample A, undockered, has an unacceptable level of chips in category #4.
2. When the dough pieces were heat treated (samples C*, D* E* and F*) the number of bubbles increased as the level of heat treatment increased, but no undesirable category #4 and #5 chips were produced.
3. The decreased equilibration time between heating and frying in sample F* resulted a slight decrease in bubbling when compared with sample E*.

TABLE 7

| Sample | DOUGH SHEET Moist % | DOUGH SHEET Thick mm | HEAT TREATMENT Reten Time-sec | HEAT TREATMENT Time after heat to fry-sec | FRIED PRODUCT Fry time sec | Bubble Size Distribution 1 % | Bubble Size Distribution 2 % | Bubble Size Distribution 3 % | Bubble Size Distribution 4 % | Bubble Size Distribution 5 % | BF Index | Fat % | Product Score |
|---|---|---|---|---|---|---|---|---|---|---|---|---|---|
| A* | 44.0 | 0.75 | | | 45 | 0 | 23 | 64 | 13 | 0 | 48 | 36.5 | 25 |
| B* | 44.0 | 0.75 | | | 45 | 48 | 52 | 0 | 0 | 0 | 13 | 31.0 | 50 |
| C*(a) | 44.0 | 0.75 | 6 | 18 | 45 | 10 | 90 | 0 | 0 | 0 | 23 | 30.9 | 70 |
| D*(a) | 44.0 | 0.75 | 12 | 18 | 45 | 9 | 37 | 54 | 0 | 0 | 36 | 29.1 | 90 |
| E*(a) | 44.0 | 0.75 | 15 | 18 | 45 | 3 | 65 | 32 | 0 | 0 | 32 | 27.8 | 90 |
| F*(a) | 44.0 | 0.75 | 15 | 3 | 45 | 7 | 60 | 33 | 0 | 0 | 32 | 27.6 | 90 |

(a) Infrared heaters 1800 watts/ft$^2$ at 2.25 inches

We claim:

1. A process for preparing fried chip products, said process inducing a controlled level of bubbling on the exterior of said chip products, said process comprising:
   a. preparing a sheeted dough having from about 30% to about 55% moisture;
   b. forming said dough into a dough sheet having upper and lower dough surface portions and an inner dough portion, said dough sheet having a thickness of from about 0.5 mm to about 1.5 mm, and dividing said dough sheet into individual dough preforms;
   c. treating the dough preforms immediately prior to frying to reduce the total moisture to between about 30% and 45% and the moisture level of the upper and lower dough surface portions to a moisture content substantially lower than the moisture content of the inner dough portion; and
   d. frying the dough preforms without substantial moisture equilibration between the upper and lower dough surface portions and the inner dough portion, such that the steam produced within the inner dough portion during frying is retained within said inner dough portion and upon expansion creates bubbles on the upper and lower dough surface portions.

2. The process of claim 1, including preparing the dough preform from potatoes or cereal grains.
3. The process of claim 1, including treating the dough preforms with an airstream impacting thereon at a rate from about 150 fps to about 400 fps to induce moisture removal therefrom.
4. The process of claim 3, including heating the airstream to a temperature of from about 250° F. (121° C.) to about 550° F. (289° C.).
5. The process of claim 1, including treating the dough sheet with infrared radiation.
6. The process of claim 1, including heating the upper and lower dough surface portions such that the permeability to moisture transfer of such upper and lower dough surface portions is less than the permeability to moisture transfer of the inner dough portion.
7. A process for preparing fried chip products having a controlled level of bubbling on the exterior thereof, said process comprising:
   a. preparing a sheeted dough having from about 30% to about 55% moisture;
   b. forming said dough into a dough sheet having upper and lower dough surface portions and an inner dough portion, said dough sheet having a thickness of from about 0.5 mm to 1.5 mm, and dividing said dough sheet into individual dough preforms;
   c. treating at least one of the upper and lower dough surface portions immediately prior to frying to reduce the moisture of said at least one dough surface portion to a moisture content substantially lower than the moisture content of the inner dough portion; and
   d. frying the dough preforms at a moisture content of between about 30% and 45% without substantial moisture equilibration between said at least one dough surface portion and the inner dough portion, such that steam produced within the inner dough portion during frying is retained within said inner dough portion and upon expansion creates bubbles on the surface of at least one dough surface portion.
8. The process of claim 7, including treating said at least one dough surface portion with an airstream impacting the dough sheet of at a rate from about 150 fps to about 400 fps to induce moisture removal therefrom.
9. The process of claim 8, including heating the airstream to a temperature of from about 250° F. (121° C.) to about 550° F. (289° C.).
10. The process of claim 7, including treating said at least one dough surface portion with heat to cause evaporation of moisture therefrom.
11. A process for preparing fried chip products having a controlled level of bubbling on the exterior thereof, said process comprising:

a. preparing a sheeted dough having from about 30% to about 55% moisture;
b. forming said dough into a dough sheet having upper and lower dough surface portions and an inner dough portion, said dough sheet having a thickness of from about 0.5 mm to about 1.5 mm;
c. treating the dough sheet to reduce the moisture of the upper and lower dough surface portions to a moisture content substantially lower than the moisture content of the inner dough portion; and
d. frying the dough sheet without substantial moisture equilibration between the upper and lower dough surface portions and the inner dough portion, such that steam produced within the inner dough portion during frying is retained within said inner dough portion and upon expansion creates a first bubble portion extending through only one of the upper or lower dough surface portions, and a second bubble portion having bubbles extending through both of the upper and lower dough surface portions.

12. The process of claim 11, including creating the second bubble portion having upper and lower bubble walls.

13. The process of claim 12, including creating upper and lower bubble walls having substantially equal bubble wall thickness.

14. The process of claim 11, including cutting the dough sheet into individual dough preforms prior to treating the dough sheet.

15. A process for preparing fried chip products having a controlled level of bubbling on the exterior thereof, said process comprising:

a. sheeting a dough having from about 30% to about 55% moisture;
b. forming said dough into a dough sheet having upper and lower dough surface portions and an inner dough portion, said dough sheet having a thickness of from about 0.5 mm to about 1.5 mm; and
c. treating the dough sheet to reduce the moisture of the upper and lower dough surface portions to a moisture content substantially lower than the moisture content of the inner dough portion, said dough sheet losing from about 0.1 to about 0.35 pounds of water per pound of solids content in said dough sheet.

16. A sheeted dough preform which when fried produces a chip product having a controlled, predetermined level of surface bubbling, said dough preform immediately prior to frying comprising:

a. an inner dough portion;
b. upper and lower dough surface portions surrounding the inner dough portion, said upper and lower dough surface portions having a moisture content substantially lower than the moisture content of the inner dough portion, and said upper and lower dough portions having been case hardened by selective removal of moisture therefrom; and
c. said dough preform having dockering holes therein having a density of less than about 160 holes per square inch of dough surface.

17. The dough preform of claim 16, wherein the dockering holes have a diameter of from about 0.020 inches to about 0.032 inches.

18. The dough preform of claim 16, wherein the dough is comprised primarily of high water absorbent ingredients.

* * * * *